US008895861B2

(12) United States Patent
Cotton et al.

(10) Patent No.: US 8,895,861 B2
(45) Date of Patent: Nov. 25, 2014

(54) STRUCTURAL INSULATOR

(75) Inventors: Ian Cotton, Wirral (GB); Md Nor Ramdon Bin Baharom, Selangor (MY); Simon M. Rowland, Tarporley (GB); David Chambers, Loughborough (GB); Nicholas Weatherby, Loughborough (GB); Matthew Thorne, Loughborough (GB)

(73) Assignee: Arago Technology Limited, Manchester (GB)

( * ) Notice: Subject to any disclaimer, the term of this patent is extended or adjusted under 35 U.S.C. 154(b) by 328 days.

(21) Appl. No.: 13/400,400

(22) Filed: Feb. 20, 2012

(65) Prior Publication Data

US 2012/0205139 A1  Aug. 16, 2012

Related U.S. Application Data

(63) Continuation of application No. PCT/GB2010/001574, filed on Aug. 20, 2010.

(30) Foreign Application Priority Data

Aug. 21, 2009  (GB) .................................... 0914678

(51) Int. Cl.
  *H01B 17/16*  (2006.01)
  *H02G 3/30*  (2006.01)
  *H02G 7/05*  (2006.01)

(52) U.S. Cl.
  CPC . *H02G 7/053* (2013.01); *H02G 3/24* (2013.01)
  USPC .................. 174/158 R; 174/137 R; 174/45 R

(58) Field of Classification Search
  CPC .......... H02G 3/24; H02G 7/053; H02G 7/05; H02G 7/06; H02G 7/08; H01B 17/02; H01B 17/06; H01B 17/12
  USPC ............ 174/162, 158 R, 137 R, 45 R, 44, 43, 174/156, 148, 135, 138 R, 138 D, 138 F, 174/138 G
  See application file for complete search history.

(56) References Cited

U.S. PATENT DOCUMENTS 3,264,401 A * 8/1966 Lantz .............................. 174/42
3,291,899 A * 12/1966 Ward et al. .................... 174/148
(Continued)

FOREIGN PATENT DOCUMENTS

FR  699040  2/1931
FR  2612549  9/1988
(Continued)

OTHER PUBLICATIONS

Dec. 23, 2009 UKIPO Search Report.
(Continued)

*Primary Examiner* — Hoa C Nguyen
*Assistant Examiner* — Amol Patel
(74) *Attorney, Agent, or Firm* — Bose McKinney & Evans LLP

(57) ABSTRACT

An electrically insulating cross-arm for a tower for high-voltage power networks. The cross-arm includes an insulating structural member for attachment to the tower body and to support a conductor cable. The insulating structural member comprises a solid rigid spine extending along a long axis having cross sectional profile, normal to the long axis, having a second moment of area of its cross sectional profile about every axis normal to the long axis and dissecting its centroid has a value of $A^2/2\pi$ or more, where A is the area of the cross sectional profile. The structural member provides resistance to bending and compressive buckling and allows conductors to be safely supported at reduced tower height. T and Y shaped cross sections provide water run-off and inhibition of organic growth. The structural members are also generally useful as insulator members in high voltage power networks.

18 Claims, 11 Drawing Sheets

(56) References Cited

U.S. PATENT DOCUMENTS

| | | | | |
|---|---|---|---|---|
| 3,296,358 | A | * | 1/1967 | Fiero et al. .................. 174/43 |
| 3,586,758 | A | * | 6/1971 | Harmon et al. ........... 174/158 R |
| 4,523,054 | A | * | 6/1985 | Baker et al. ................ 174/45 R |
| 4,867,399 | A | | 9/1989 | Therond |
| 5,637,827 | A | * | 6/1997 | Goch .............................. 174/30 |
| 6,621,009 | B1 | | 9/2003 | Okuno et al. |
| 2004/0135133 | A1 | | 7/2004 | Fujii |

FOREIGN PATENT DOCUMENTS

| | | | |
|---|---|---|---|
| GB | 919534 | | 2/1963 |
| GB | 1034224 | | 6/1966 |
| JP | 06-335144 | | 12/1994 |
| JP | 06335144 | A * | 12/1994 |
| WO | WO 2009/049376 | | 4/2009 |
| WO | WO 2009049376 | A1 * | 4/2009 |

OTHER PUBLICATIONS

Dec. 15, 2011 PCT Search Report.
EP 10 766 081.3 Office Communication; Mar. 7, 2014, 6 pages.
C. Zacharades, et al., Design and Testing of a 400 KV Insulating Cross-Arm, International Electrical Insulation Conference "INSUCON", Birmingham, UK (2013), 5 pages.

\* cited by examiner

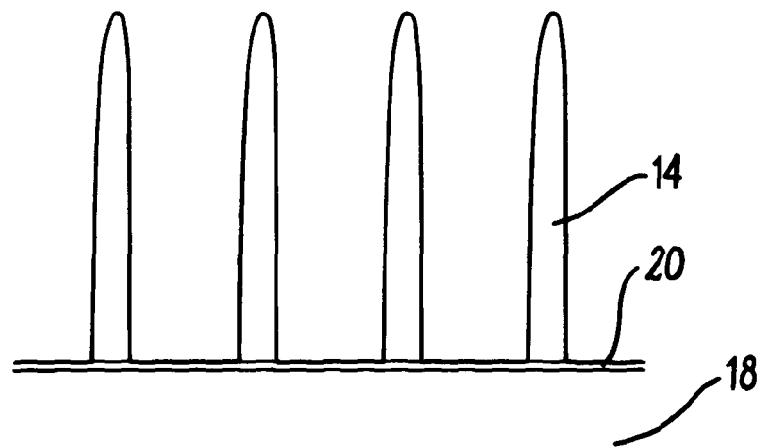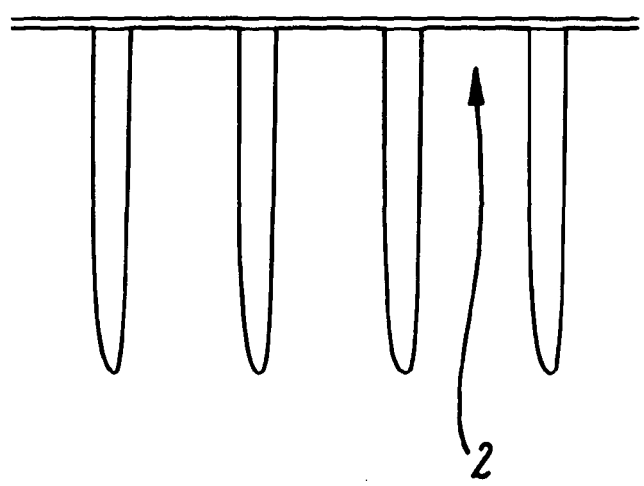
FIG. 8

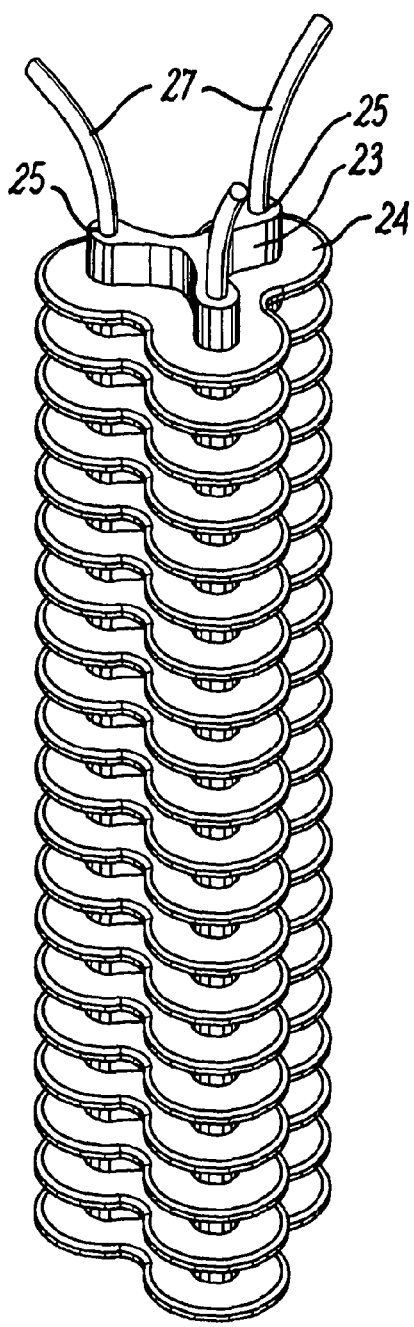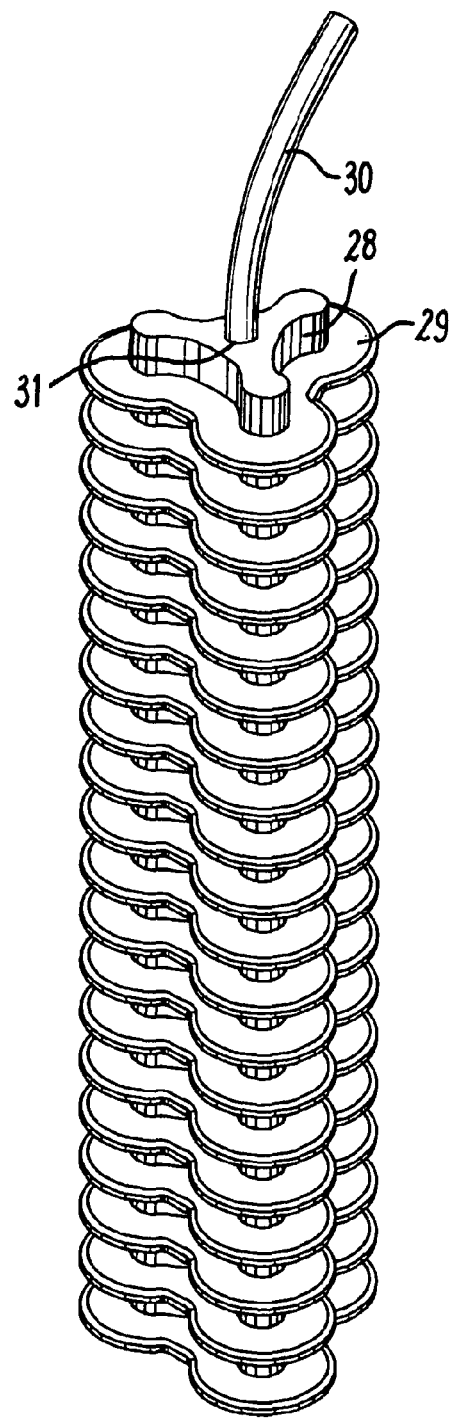

STRUCTURAL INSULATOR

This is a continuation of International Application PCT/GB2010/001574, with an international filing date of Aug. 20, 2010, and which claims priority from GB 0914678.8 filed on Aug. 21, 2009, and the disclosures of both of these applications from which priority is claimed are incorporated herein by reference.

FIELD

The present invention relates to insulating members suitable for use in high voltage electrical power networks and methods for their production. The insulating members are able to withstand compressive buckling and bending forces. The invention also relates to cross-arms for power network towers which incorporate such members and towers with such cross-arms.

BACKGROUND

Electricity transmission networks are based on designs dating back to the early 20th century. In recent times, as the demand for electricity has increased and more power is generated from dispersed, renewable energy sources, high voltage transmission networks are approaching full capacity with increasing risks of overloading certain routes. The IEC standards define high voltage (HV) as greater than 1 kV. Typically, high voltage transmission lines operate at voltages in excess of 100 kV, perhaps several hundred kV. Typical voltages used in power networks are 275 kV and 400 kV but voltages up to 1 MV or more may be used.

Although it is possible to build new networks, this is costly, time consuming and can meet opposition from local residents. An alternative to installing a new power system would be to upgrade power carried by the existing networks by either increasing the voltage or the current for the existing transmission lines. Increasing the current on an existing circuit can lead to an increased amount of conductor sag through conductor heating and this can cause infringement of ground clearance regulations. Increasing the voltage on an existing circuit will cause a greater risk of flashover (short circuit to earth or between phases) and may result in the system being in breach of statutory regulations. Either solution will also lead to increased electromagnetic fields at ground level. The requirements for minimum ground clearances, a reliable system (i.e., one that does not flashover) and limits on the electromagnetic field strength at ground level mean that the possibility of increasing voltages or currents for existing tower designs is limited. These issues also limit the ability to make existing tower designs more compact. In common usage, support towers for high voltage power systems are also referred to as pylons.

A conventional tower has a body made of steel, with steel cross-arms, usually fabricated from L-section high tensile steel members. The conductors are held suspended from the ends of cross-arms by insulators. For a 275 kV system, the insulators would typically be about 2.5 m in length. The insulators hold the suspended conductors under tension and keep them spaced from the tower body and from the cross-arm itself. The height of the lowest cross-arm above ground level must take into account sag of the transmission lines due to the combined effects of ambient temperature, temperature rise from solar radiation and temperature rise from resistive heating. The electromagnetic field levels at ground level generated from the transmission conductors must also be considered. It is also important that the conductors are held high enough above ground that the minimum statutory clearance is not breached. The length of the cross-arm must be sufficient to ensure that conductor swing (through wind-driven oscillations of the insulator) does not lead to the conductors coming into close proximity to the tower body, ensuring a low risk of flashover to the pylon body. In addition to being capable of bearing the weight of the transmission conductors, the cross-arm must also be strong enough to bear the additional loads that may arise, for instance, as a result of conductor icing, wind loads, conductor breakage (which could lead to high lateral forces on a cross-arm) or a combination thereof.

Insulators used for suspending conductors from pylon cross-arms are typically provided with sheds spaced along their length in order to increase the creepage path (i.e., the shortest distance between the ends of the insulator measured over the surface). In order to inhibit current leakage by surface conduction, a ratio of creepage distance to insulator length of at least 2 is desirable.

It is desirable to be able to increase the voltage rating or current rating for power transmission networks without the need to replace existing tower bodies and without increasing the risk of flashover. It is also desirable to reduce electromagnetic field strength at ground level near towers. It is also desirable to be able to design tower bodies that are more compact than existing designs.

British Patent GB 1,034,224 discloses insulators used as structural members of cross-arms or frames for supporting overhead line conductors from poles or towers. The insulator disclosed comprises two or more separate rods of resin-bonded fiber spaced apart along their length by mutually spaced insulating cross-members jointed to the rods at intervals in order to restrain the rods from buckling under compressive loads. The rods are disclosed as being of square or circular cross section.

Japanese patent publication JP06-335144 discloses the use of cross-arms as insulators for transmission lines, with a number of arm members combined into a truss arrangement. The cross-arms disclosed are circular or hollow in cross-section.

SUMMARY OF THE INVENTION

It has now been realized by the inventors that the conductive cross-arms of a conventional tower or pylon can be replaced by cross-arms formed from insulating members, provided that one or more insulating members making up the cross-arm can be formed in such a way that they are resistant to buckling due to the compressive forces which may be experienced by a tower cross-arm in use. By dispensing with a dangling insulator and replacing it by a strong yet lightweight insulating cross-arm, it has been found that the conductors may be suspended directly from the end of the cross-arm, allowing a voltage increase without an increased risk of flashover. If the insulating cross-arm is kept at the same height as a corresponding conventional conductive cross-arm, the conductors are held higher from the ground and do not swing towards the tower owing to a fixed mounting point. Also, by dispensing with a dangling insulator and replacing it by a strong yet lightweight insulating cross-arm, it has been found that the conductors may be suspended directly from the end of the cross-arm, allowing an increase in the overhead line current carrying capability. This is because, if the insulating cross-arm is kept at the same height as a corresponding conventional conductive cross-arm, the conductors are held higher from the ground and the amount of allowable conductor sag will be increased. Alternatively and for a fixed voltage and current, it has been found that the lowest cross-arm on a tower may be located closer to the ground, even though the transmission conductors are maintained at the same height as for a conventional conductive cross-arm, such that the overall height of the tower body may be reduced or may carry an extra pair of cross-arms for the purpose of, for instance, high voltage direct current (HVDC) transmission or the like. Similarly, if voltage or current are increased, such that risk of sag is greater and electromagnetic fields at ground level would be increased, the absence of need for dangling insulators means that conductors may be held higher above the ground, to avoid such problems without the need to increase tower height.

In addition, removal of the existing suspension insulators between the cross arm and the conductors eliminates conductor swing near the tower body which greatly improves system reliability during high winds.

Hence it is one object of the invention, amongst others, to provide an insulating cross-arm for a tower formed in such a way that it is resistant to the compressive forces and buckling forces which may be experienced by a tower cross-arm in use, but which is also lightweight and resistant to damage in use. It is another object of the invention to provide insulating members with an improved resistance to buckling which is lightweight and resistant to damage in use.

Hence, a first aspect of the invention provides an electrically insulating cross-arm for a tower arranged to carry power conductors spaced from a body of said tower, the cross-arm comprising at least one first insulating structural member having a proximal end adapted for attachment to the tower body and a distal end adapted for attachment to a conductor support means, wherein the first insulating structural member comprises or consists essentially of a solid rigid spine extending along a long axis between the distal and proximal ends and wherein the spine has a cross sectional profile, normal to the long axis, having a centroid and wherein the second moment of area of the cross JO sectional profile about every axis normal to the long axis and dissecting the centroid has a value of $A^2/2\pi$ or more, where A is the area of the cross sectional profile.

This ensures that the first insulating structural members are adapted to resist 15 buckling and compressive loading.

A second aspect of the invention provides a tower for high voltage power networks comprising one or more cross-arms according to the first aspect of the invention.

A third aspect of the invention provides an insulating structural member, for use with high voltage power networks, comprising or consisting essentially of a rigid spine extending along a long axis between the distal and proximal ends wherein the spine has a cross sectional profile, normal to the long axis, having a centroid, wherein the second moment of area of the cross sectional profile about every axis normal to the long axis and dissecting the centroid has a value of $A^2/2\pi$ or more, where A is the area of the cross sectional profile. The insulating structural member may have a length at least 5 times its greatest width.

A fourth aspect of the invention provides a method for forming an insulating structural member according to the third aspect of the invention comprising the step of forming the rigid spine by a pultrusion.

BRIEF DESCRIPTION OF THE DRAWINGS

The above mentioned and other features of this invention, and the manner of attaining them, will become more apparent and the invention itself will be better understood by reference to the following description of embodiments of the invention taken in conjunction with the accompanying drawings, wherein FIG. 8 shows a cross-sectional view through first insulating structural member 2 of the first or second embodiment along section C-C from FIG. 4, with the cross-section taken parallel to the long axis of the member, FIG. 12 shows an insulating member according to the fourth embodiment, with conductors present and FIG. 13 shows an insulating member according to a fifth embodiment of the invention which is according to the third aspect of the invention and with a conductor present.

Figure 1:
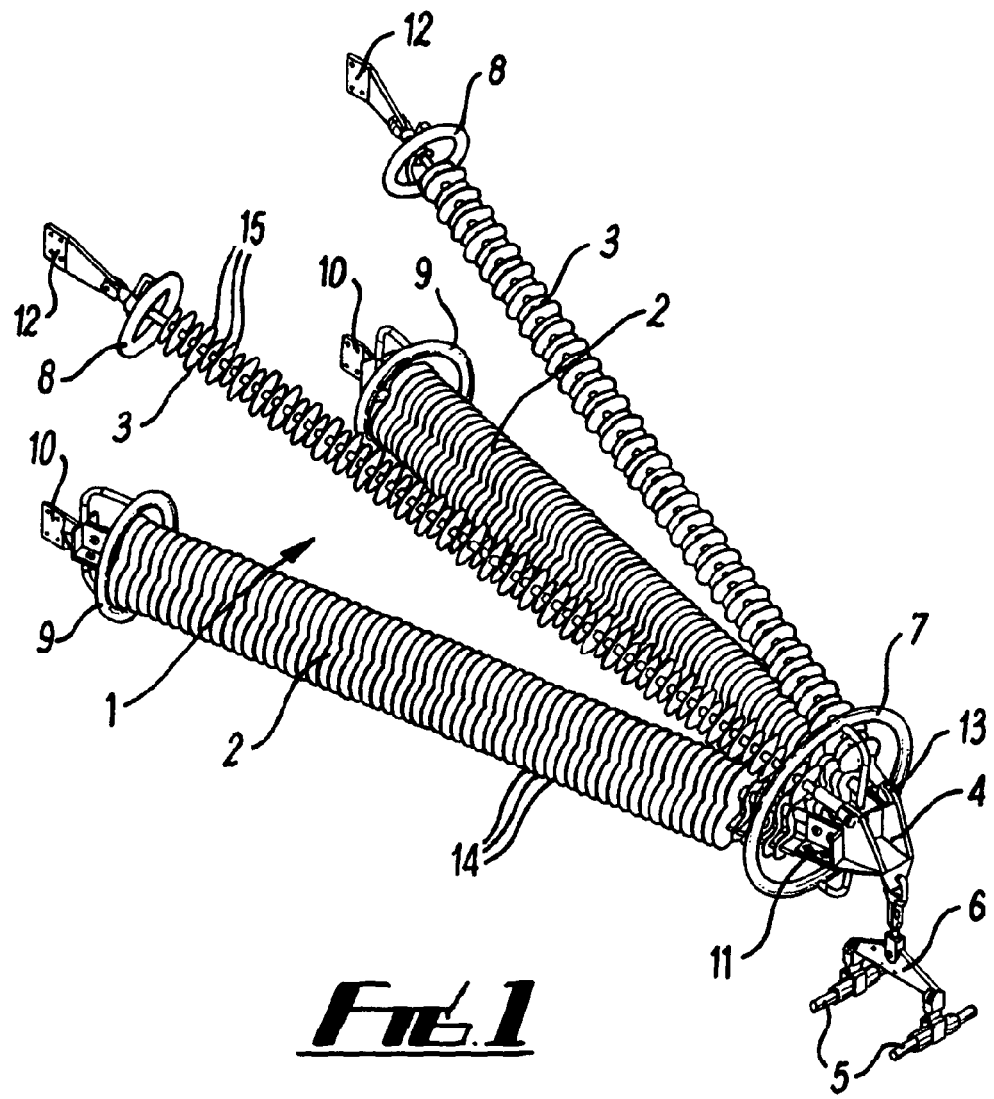
FIG. 1 shows an isometric view of a cross-arm according to a first embodiment of the first aspect of the invention.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION OF INVENTION

The features set out below in the detailed description of the invention are applicable to all aspects of the invention, where appropriate, and may be combined together as desired.

For the sake of clarity, throughout this specification, the term "comprising" or "comprises" means including the component(s) specified but not to the exclusion of the presence of others. The term "consisting essentially of" or "consists essentially of" means including the components specified but excluding other components except for materials present as impurities, unavoidable materials present as a result of processes used to provide the components, and components added for a purpose other than achieving the technical effect of the invention.

Whenever appropriate, the use of the term "comprises" or "comprising" may also be taken to include the meaning "consists essentially of" or "consisting essentially of.

The first aspect of the invention provides an electrically insulating cross-arm for a tower. It includes at least one first insulating structural member having a proximal end adapted for attachment to the tower body, for instance by means of a fastening arrangement, such as a bolting plate, for instance, and a distal end adapted for attachment to a conductor support means, again, for instance by means of a fastening arrangement, such as a bolting plate, for instance.

The first insulating structural member comprises or consists essentially of a rigid spine extending along an axis between its distal and proximal ends. The spine is adapted to resist buckling and compressive loading by having a cross sectional profile, normal to the long axis, having a centroid such that the second moment of area of the cross sectional profile about every axis normal to the long axis and dissecting the centroid has a value of $A^2/2\pi$ or more, where A is the area of the cross sectional profile. In other words, the second moment of area of the cross sectional profile is at least 2.0 times the second moment of area of a hypothetical circular profile centered on the centroid and having the same area as the cross sectional profile.

The concept of second moment of area is used in structural engineering to provide a parameter that can be used to predict the resistance of beams to bending and deflection. The deflection of a beam under load depends not only on the load, but also upon the geometry of the beam's cross-section and its length. This is why beams with higher second moments of area, such as I-beams, are more frequently used in building construction than other beams with the same cross-sectional area (for instance cylindrical rods). The second moment of area gives an estimate of the distribution of material about an axis, and the skilled person will be aware that a beam cross section having a higher second moment of area, for the same cross-sectional area (i.e. weight) gives a greater resistance to deformation for the beam of higher second moment of area. It should be noted that in this description, the moment of area is measured about axes passing through the centroid of the cross sectional profile and normal to the long axis of the spine. The cross sectional profile lies in a plane normal to the long axis such that the second moment of area is measured about axes coplanar with the cross sectional profile.

Suitably, the second moment of area about the axes dissecting the centroid is at least 2.0 times the second moment of area of a hypothetical circular profile centered on the axis and having the same area as the cross-sectional profile of the spine, preferably at least 3.0 times, more preferably at least 4.0 times. In other words, the second moment of area is at least 2.0 times that of a cylindrical rod having the same cross-sectional area (and hence the same weight if made of the same material). This value has been found to provide adequate resistance to deformation for the solid insulating structural members.

The second moment of area about an axis is easily measured by simple integration of the value for (area×(distance from axis)$^2$) for the cross sectional profile and comparing it to the value for a circle of equivalent area (i.e., $A^2/4\pi$, where A is the area of the circle) about an axis in the plane of the circle and passing through its center.

Hence, the second moment of area of the cross sectional profile about every axis normal to the long axis and dissecting the centroid has a value of $A^2/2\pi$ or more, preferably $3A^2/2\pi$, and may be $2A^2/2\pi$ or more. This defines a "minimum" second moment of area for the cross-sectional profile which is the lowest value obtained about any of the specified axes. Preferably, the minimum second moment of area has a value of $4A^2/2\pi$ or less, or even $3A^2/2\pi$ or less, and may be $2A^2/2\pi$ or less. Excessively high values for the second moment of area may lead to a shape which is prone to local buckling. In order to increase the second moment of area, it is necessary to provide some sections of profile which are relatively thin. Excessively high second moments of area may also result in a cross-sectional profile which is prone to build-up of deposits and trapping of pollutants because of multiple concave faces.

The spine is suitably substantially uniform in cross-sectional profile and in cross-sectional area along its length such that it may be formed by pultrusion. However, it may be non-uniform. For instance, the cross sectional area may taper from a larger area at the proximal end of the spine to a smaller area at the distal end of the spine. Preferably, the spine is of unitary construction. Hence, the spine of the invention has good resistance to bending without the need for multiple parallel spines joined by traverse members, such as disclosed in GB1,034,224, and so a single spine is adequate.

The cross-arm's resistance to buckling may be improved by the addition of a second insulating structural member having a proximal end adapted for attachment to said tower body and a distal end adapted for attachment to the conductor support means, the second insulating structural member being adapted to resist at least tensile loading. Hence the second member may act in use as a tensile support arm for the conductor support means whilst the first member acts to support compressive forces directed through the conductor support means and acts to resist buckling. Hence the second insulating structural member does not have to be adapted to resist compressive stresses or buckling forces, though it may be so adapted.

Typically, the cross-arm of the invention in use on a tower will have one, usually two or more first insulating structural members positioned substantially horizontally and connected to the conductor support means at a nose or apex below one, usually two or more second insulating structural members connected to the conductor support means at the nose or apex such that the second insulating structural member or members support the conductor support means under tension.

In a preferred configuration, the cross-arm in use comprises two first insulating structural members located below two second insulating structural members together arranged to form a pyramidal structure extending from a quadrilateral base at the tower body to an apex at the conductor support means. By pyramidal is meant a shape having a quadrilateral base, the corners of the base connected to an apex. Other configurations such as a tetrahedral arrangement are also suitable (i.e., a triangular base with the vertices of the triangle connected to an apex).

Preferably, proximal conductive grading rings are provided at the proximal ends of the first and second insulating structural members. A grading ring is a conductive member, usually of a conductive metal, arranged to encircle an insulator where it is connected to a conductor. The grading ring serves to reduce high electric fields and to reduce damage to the insulators from any electrical discharge created by these high electrical field stresses caused by the system geometry, sharp edges, bolt heads or the like on attachment plates joining the proximal ends of the insulating structural members to the tower body.

Preferably, a further distal conductive grading ring assembly is provided at the apex or nose of the cross-arm, particularly when this is a pyramidal structure.

The distal conductive grading ring assembly preferably comprises a distal grading ring arranged to encircle the distal ends of the first and second insulating members and a conductive post in conductive contact with the distal grading ring, located centrally within the distal grading ring and extending into a space formed between the distal ends of the first and second insulating members. The central conductive post assists in ensuring a managed electrical field around each of the insulating structural members meeting at the apex or nose of the cross-arm at the conductor support means.

The distal conductive grading ring as detailed herein may be of use with any insulating cross-arm assembly, and is not particularly limited for use with the cross-arm assembly of the invention.

The cross-arm may comprise one or more redundant members arranged to interconnect the insulating first and second structural members, the one or more redundant members adapted to resist tension or compression.

The cross-arm, especially when in the form of a tetrahedral or pyramidal structure, suitably comprises redundant members arranged to interconnect the insulating first and second structural members, the redundant members adapted to resist tension or compression. The use of redundant members is known for the purpose of increasing the load bearing capacity of framework structures. Preferably, the redundant members are configured substantially parallel to a plane of the base of the cross-arm. More preferably, redundant members that are not configured substantially parallel to the plane of the base of the cross-arm are not present. The redundant members may be insulating, conducting or semi-conducting members. By "redundant members" is meant structural members capable of withstanding tension and compression, such as suitable beams, rods or bars, which although not required to support load, produce or maintain structural stability. Their presence may be desirable either to increase the load bearing capacity of a structure (if the cross sectional profiles of insulating members are left unchanged) or to permit reduction in cross sectional area of the insulating members (with a corresponding decrease in overall weight for the same load bearing capacity of cross-arm).

Preferably, the rigid spine of the first insulating member comprises at least two rib-like protrusions extending along the longitudinal axis, arranged to form at least one substantially concave face therebetween.

The rib-like protrusions may be flat, shaped or lobed, and may meet to form the concave face therebetween at an angle or at a fillet, a fillet being a curve inside an angle serving to prevent concentration of stress. If flat, the protrusions may be referred to as arms, if rounded, as lobes. Other arrangements are referred to as "shaped", so for instance four petal-shaped elliptical ribs meeting at the spine would yield a cross-sectional profile of a flower shape. For instance, the rigid spine may have the form of an L section, where the two ribs are flat ribs with a 90° angle between them forming the concave face, or the rigid spine may have the form of an I-beam, where each rib is a T-shaped rib joined together at the bases of the T-shape to give an I-profile with two concave faces on each side of the I. Such an arrangement of two or more rib-like protrusions serves to provide a rigid spine having a cross-sectional profile with the required high second moment of area. The requirement for a concave face means that there is a distribution of material away from the axis leading to augmentation of the second moment of area of the cross-sectional profile.

An alternative way to describe the cross-sectional profile of the rigid spine is using the terminology of "webs" and "flanges". For an I-beam, the web is the central pillar of the I and the top and bottom cross-pieces are known as flanges. Webs generally extend outwards from or through the centroid of a cross-sectional profile with flanges mounted at the end of a web. Hence the web serves to provide a means for holding the material in the flange at a location distant from the centroid, thus serving to assist in providing a higher second moment of area about the centroid. Hence, the rib-like protrusions described herein may be considered as webs extending from a central region of a cross-sectional profile and optionally provided with flanges at their distal ends. Hence a T-beam could be considered as a web, the central arm of the T, with a flange at one end (the cross-arm of the T), or may be considered as three webs each extending out from the crossing point of the T. A Y-beam could be considered as three webs each extending out from the center of the Y.

Preferably, to achieve a high second moment of area, the rigid spine may comprise three rib-like protrusions extending along the axis, arranged to form at least two substantially concave fillets therebetween. In this case the cross-sectional profile may be, for instance T-shaped or Y-shaped, with the three rib-like protrusions forming the arms. The ends of the arms may be rounded or lobed or, for instance, provided with flanges.

In a particularly preferred arrangement, the ribs are arranged to provide two concave faces and one flat or convex face therebetween. This may be described, for instance, as a T-shaped arrangement where one of the faces of the T (the top of the T) is flat or a drooping T or mushroom cross-section where the top face of the mushroom is convex. The ends of the arms of the T or mushroom shape are suitably rounded or lobed.

Suitably, the cross-arm is adapted for positioning in use such that the first insulating member is positioned with the concave faces directed upwards and outwards, and the flat or convex face directed downwards, whereby water-run-off is facilitated. The cross-arm may be positioned with the axis of the rigid spine in a substantially horizontal configuration, but may be positioned such that it lies at an angle to the horizontal in use.

In use, the first insulating members are prone to weather, surface contamination by pollutants and buildup of deposits from algae or lichen growing on surfaces of the rigid spine. For this reason, an arrangement with three rib-like protrusions is preferred in order to minimize the number of concave fillets between ribs, whilst maintaining high second moment of area, such that collection of water or debris in use is reduced.

An arrangement with two concave faces and one flat or convex face therebetween is particularly preferred because such a first insulating member may be positioned in use with the flat or concave face facing downwards and the concave surfaces facing upwards and outwards, with the axis of the rigid spine in a substantially horizontal configuration. The shape of the concave surfaces may be chosen to encourage water-run-off, so that collection of water or deposits in or on these surfaces may be obviated. As for the bottom flat or convex surface, this will not be highly shaded in use and so the growth of shade-loving algae or lichens will be reduced. Hence the configuration provides an arrangement for the first insulating structural member that is strong and lightweight, resistant to buckling and compressive stress and yet which is also positionable in use to avoid buildup of water or deposits which may lead to degradation of the insulative properties of the member.

The second insulating members may have any suitable cross-sectional profile as they do not have to be able to withstand buckling forces or compressive forces, so for instance a simple circular cross-sectional profile may be employed as this profile is also useful to avoid buildup of water or deposits which may lead to degradation of the insulative properties of the member.

Suitably, the cross-sectional profile of the rigid spine of the first insulating structural member has a curved perimeter such that the curved perimeter has a radius of curvature at all points thereon whose magnitude is greater than 1%, of the greatest width of the cross-sectional profile measured along all axes dissecting the centroid, preferably greater than 2%. Typically, this will be greater than 5 mm at all points thereon, preferably greater than 10 mm, more preferably greater than 20 mm. This ensures that sharp concave angles which may lead to collection of debris or sharp convex angles prone to damage of the insulating surface and subsequent electrical discharge following damage are avoided.

Suitably, the insulating structural members are provided with sheds whereby a creepage distance along each insulating member exceeds its length: typically the creepage distance is up to 5.5 times the actual length of an insulating member, say from 2 to 5 times the length. Sheds are items which are commonplace in the field of electrical insulators and for a typical insulator the shed is a circular disc or plate, usually of glass or silicone polymer, having a central aperture allowing it to be threaded onto the spine of the insulator. Sheds may also be directly molded onto an insulating structural member, along with a silicone coating layer, directly onto the spine using silicone molding, for instance a Liquid Silicone Molding (LSM) process.

Several sheds are typically spaced substantially evenly along the length of an insulator and attached to it, the plane of the disc or plate lying normal to the long axis of the insulator. The shed may be provided with concentric circular ribs to increase the creepage length. Sheds increase the distance that any surface leakage current must traverse in order to reach earth. Sheds also assist in disrupting any leakage paths that may arise from water (e.g. rain) trickling over the surface of an insulating member. The creepage distance required for any particular situation will depend upon factors such as rain, humidity and pollution levels. Pollution build-up may increase the electrical conductivity of the surface of an insulating member and so encourage a conductive surface pathway. Greater creepage lengths are required for high pollution districts. Sheds useful for the present invention may be shaped such that a creepage path length contributed by each shed is substantially the same around its entire perimeter. In other words, rather than having a conventional circular shape, the shed shape may be tailored to substantially follow or be similar to the shape of the cross-sectional profile of the rigid spine of the first insulating structural members. This arrangement prevents wastage of shed materials (as the shortest creepage path will be the path followed for discharge) and assists in reducing the weight of the cross-arm of the invention.

The insulating members are solid and free of substantial voids. This is because voids may lead to water condensation within the insulating members leading to risk of electrical discharge. The insulating members used in the cross-arms of the invention are preferably free of structural hollows or channels extending along their lengths, and do not, for instance, include hollow sections. Clearly, with any industrial scale manufacturing process, such as pultrusion, small, unavoidable voids may be present in a structure. By "solid" in this specification it is meant free from deliberately formed hollows, voids or channels.

A second aspect of the invention provides a tower for high voltage power networks comprising one or more cross-arms according to the first aspect of the invention.

A third aspect of the invention provides an insulating structural member, for use with high voltage power networks, comprising a rigid spine extending along a long axis between the distal and proximal ends and wherein the spine has a cross sectional profile, normal to the long axis, having a centroid and wherein the second moment of area of the cross sectional profile about every axis normal to the long axis and dissecting the centroid has a value of $A^2/2\pi$ or more, where A is the area of the cross sectional profile. The insulating structural member may have a length at least 5 times its greatest width. This is achievable because of the improved resistance to bending afforded by the insulating structural member of the invention, allowing greater length to width ratio than previously available with reduced risk of excessive bending or buckling.

The greatest width of the cross-sectional profile is the greatest width as measured along all axes dissecting the centroid of the cross-sectional profile. By centroid is meant the center of area for the cross-sectional profile.

Preferred values for the second moment of area for the second aspect of the invention are as set out hereinbefore for the first insulating members of the first aspect of the invention.

Preferably, the rigid spine of the insulating structural member comprises at least two rib-like protrusions extending along the axis, arranged to form at least one substantially concave face therebetween.

The rib-like protrusions may be flat, shaped or lobed as set out hereinbefore for the first insulating members of the first aspect of the invention, and may meet to form the concave face therebetween at an angle or at a fillet, a fillet being a curve inside an angle serving to prevent concentration of stress, For instance the rigid spine may have the form of an L section, where the two ribs are flat ribs with a 90° angle between them forming the concave face, or the rigid spine may have the form of an I-beam, where each rib is a T-shaped rib joined together at the bases of the T-shape to give an I-profile with two concave faces on each side of the I. Such an arrangement of two or more rib-like protrusions serves to provide a rigid spine having a cross-sectional profile with the required high second moment of area. The requirement for a concave face means that there is a distribution of material away from the centroid leading to augmentation of the second moment of area for the cross-sectional profile.

Preferably, the rigid spine comprises three rib-like protrusions extending along the axis, arranged to form at least two substantially concave fillets therebetween. In this case the cross-sectional profile may be, for instance T-shaped or Y-shaped, with the three protrusions forming the arms.

In a particularly preferred arrangement, for use with horizontal positioning of the insulating member, the ribs are arranged to provide two concave faces and one flat or convex face therebetween. This may be described as a T-shaped arrangement where one of the faces is flat or a drooping T or mushroom cross-section where one of the faces is convex.

Suitably, in use, the insulating member may positioned with the axis of the rigid spine in a substantially horizontal configuration and with the concave faces directed upwards and outwards, and the flat or convex face directed downwards, whereby water-run-off is facilitated. In use, the insulating members are prone to weather, surface contamination by pollutants and buildup of deposits from algae or lichen growing on surfaces of the rigid spine. For this reason, the arrangement with two concave faces and one flat or convex face therebetween is preferred because such an insulating member, when intended for use in a horizontal or near horizontal position, may be positioned in use with the flat or concave face facing downwards and the concave surfaces facing upwards and outwards, with the axis of the rigid spine in a substantially horizontal configuration. The shape of the concave surfaces may be chosen to encourage run-off of water, such that collection or pooling of water or deposits in or on these surfaces may be obviated. As for the bottom flat or convex surface, this will not be highly shaded in use and so the growth of shade-loving algae or lichens will be reduced. Hence the configuration provides an arrangement for an insulating structural member that is strong and lightweight, resistant to buckling and compressive stress and yet which is also positionable in use to avoid buildup of water or deposits which may lead to degradation of the insulative properties of the member.

A particularly suitable cross-sectional profile for the rigid spine for a post-insulator (intended to be used with its length set substantially vertically) has been found to be a Y-shape with approximately equal angles (about 120°) subtended between the arms of the Y-shape and with the arms and angles rounded, the arms being substantially of the same length. This gives a member which may be light in weight yet which is highly resistant to buckling and bending and, because of the open angles, has low propensity for build-up of deposits on the concave surfaces. Shapes such as X-shapes (i.e., with four arms or rib-like protrusions) or with five or more arms or rib-like protrusions may present problems because of the smaller angles between the arms leading to shading and build-up of deposits.

Suitably, the insulating structural members are provided with sheds, as set out hereinbefore, whereby a creepage distance along each insulating member exceeds its length. Preferably, the sheds are shaped such that a creepage path length contributed by each shed is substantially the same around its entire perimeter.

When intended for use for suspension of high voltage cables and the like, insulating structural members according to the third aspect of the invention are suitably solid and free of substantial voids. This is because voids may lead to water condensation within the insulating members leading to risk of electrical discharge. The insulating members of the invention, when intended for use in this manner are preferably free of structural hollows or channels extending along their lengths, and preferably do not, for instance, include hollow sections.

However, when intended for use, for instance, as post insulators (sometimes referred to as bushings in the art) for a substation, it may be necessary to provide one or more openings or channels extending along the length of the insulating member so that high voltage conductors may pass through the body of the insulator into a sub-station, for instance. Hence the insulating structural member of the third aspect of the invention may be optionally provided with one or more channels adapted to permit high voltage conductors to extend through the insulating structural member. However, in this situation, the opening or channel may suitably be filled with an insulating oil or a silicone compound (or even a highly insulating gas such as sulphur hexafluoride). The third aspect of the invention, when used as a post insulator or bushing to carry conductors into, for instance, a substation, may be particularly useful when one or more, such as two or more channels for carrying conductors are provided in the rib-like protrusions, for instance towards their distal parts. In other words, channels for carrying conductors may be situated in the rib-like protrusions, typically extending along the length of the spine substantially parallel to the long axis of the spine, with the channels spaced from the centroid of the insulating structural member. Hence, preferably, the insulating structural member has at least one of the rib-like protrusions comprising a channel suitable for carrying a conductor. These channels may be instead of, or in addition to, a channel situated at or near the centroid of the insulating member. The channels are suitable adapted to snugly encase conductors whereby void space is reduced, and any remaining void space within a channel in use, with conductor in place, will be filled with an insulating compound as set out hereinbefore. In other words, the insulating structural members are substantially solid save for channels dimensioned to be as small as possible to permit conductors to extend through (typically along the length) of the insulating structural member.

For instance, where the insulating structural member has a T or Y-shaped cross section, there may be three channels, each located towards the distal ends of each arm of the T or Y, in addition to or instead of a fourth channel at the junction of the arms.

Compared to conventional post insulators or bushings, which have a single central channel, this arrangement gives the advantage that a single post insulator may be used to carry a plurality of conductors sufficiently spaced from each other to prevent voltage breakdown between them. For instance, three different phases may be carried by a single post insulator. For instance, some channels may be used for carrying high voltage/high current conductors whilst others are used to carry, for instance, cables carrying control signals.

Preferably, any hollow channels or voids present less than 10% of the total volume of the insulating structural members, preferably less than 5%. The surface of the insulating structural member of the invention, for use in any aspects of the invention, is suitably hydrophobic, meaning that it shows a contact angle with pure water of 90° or more (measured through the water). This allows water to bead up into droplets on the surface, encouraging them to roll off the surface. Suitably, the surface is resistant to carbonizing, such that in the event that the surface is subjected to a high voltage discharge, no permanent conductive carbon track is left. Suitably, the insulating structural member of the invention has a surface coating of a silicone polymer or silicone resin. This also applies to any sheds used in the various aspects of the invention. Typically, the spine will have a silicone sheath bonded to it and sheds molded from silicone may be adhered or bonded to the sheath covering the insulating member's spine. Alternatively, LSM may be used to provide sheds, as set out hereinbefore.

A fourth aspect of the invention provides a method for forming an insulating structural member according to the third aspect of the invention, or for use in the first or second aspects of the invention, comprising the step of forming the rigid spine by pultrusion.

Typically, the insulating member may be formed from a glass-fiber reinforced insulating resin such as E (Electrical Grade) or ECR (Electrical Grade Corrosion Resistant) glass fibers with thermosetting resins such as polyester, vinyl ester or epoxy or thermoplastic resins such as polypropylene, polyethylene terephthalate, polybutylene terephthalate, etc. Other fibers may be used for reinforcement and other suitable insulating polymers may be used with or without reinforcement fibers.

The method may comprise:
a. coating the spine with a layer of insulating silicone polymer, and
b. attaching sheds to the layer of insulating silicone polymer, for instance by use of a silicone glue.

Alternatively, for instance, the method may comprise providing the spine with a silicone sheath and sheds in a singe silicone molding process, such as LSM as set out hereinbefore.

EXAMPLES

Figure 2:
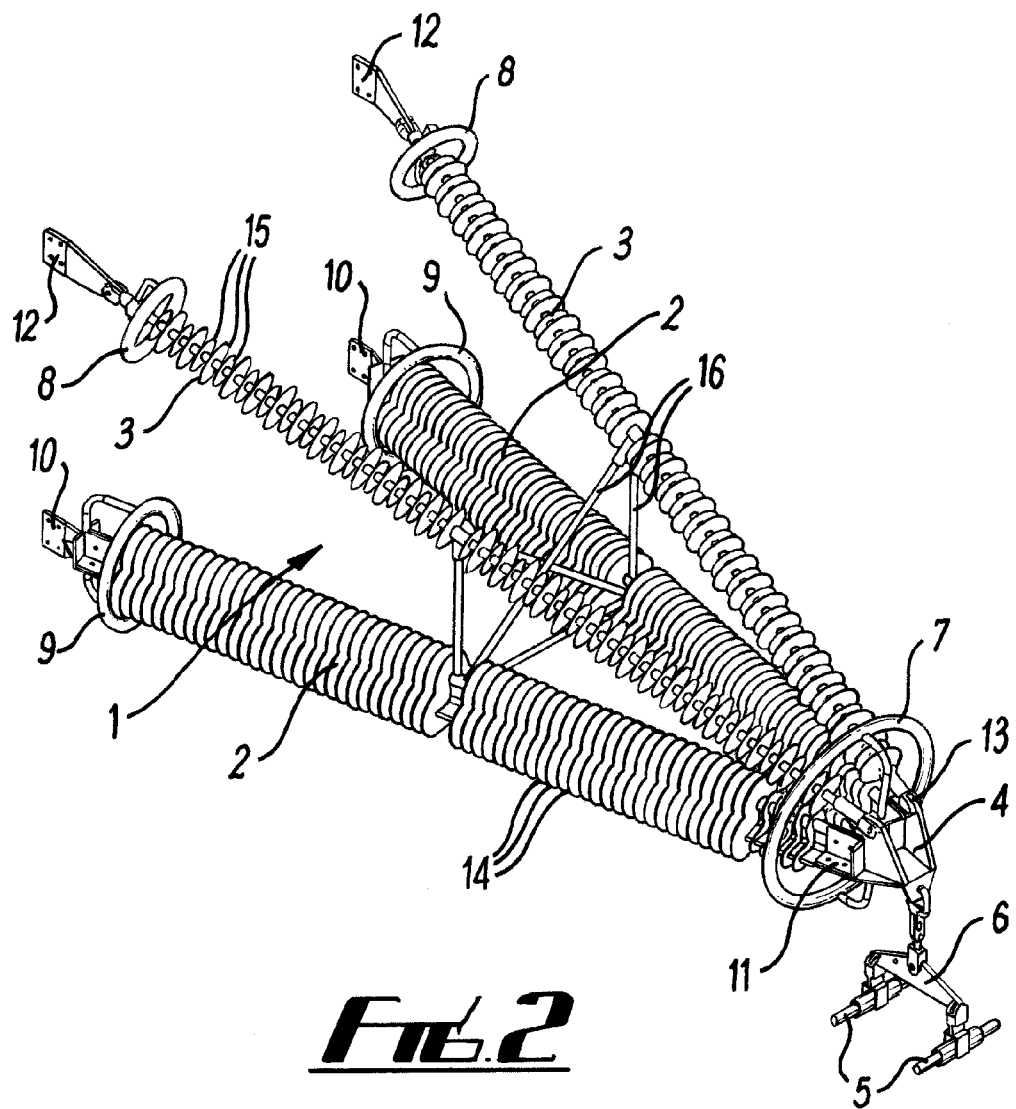
FIG. 2 shows an isometric view of a cross-arm according to a second embodiment of the first aspect of the invention, where substantially in plane redundant members are included.
Figure 3:
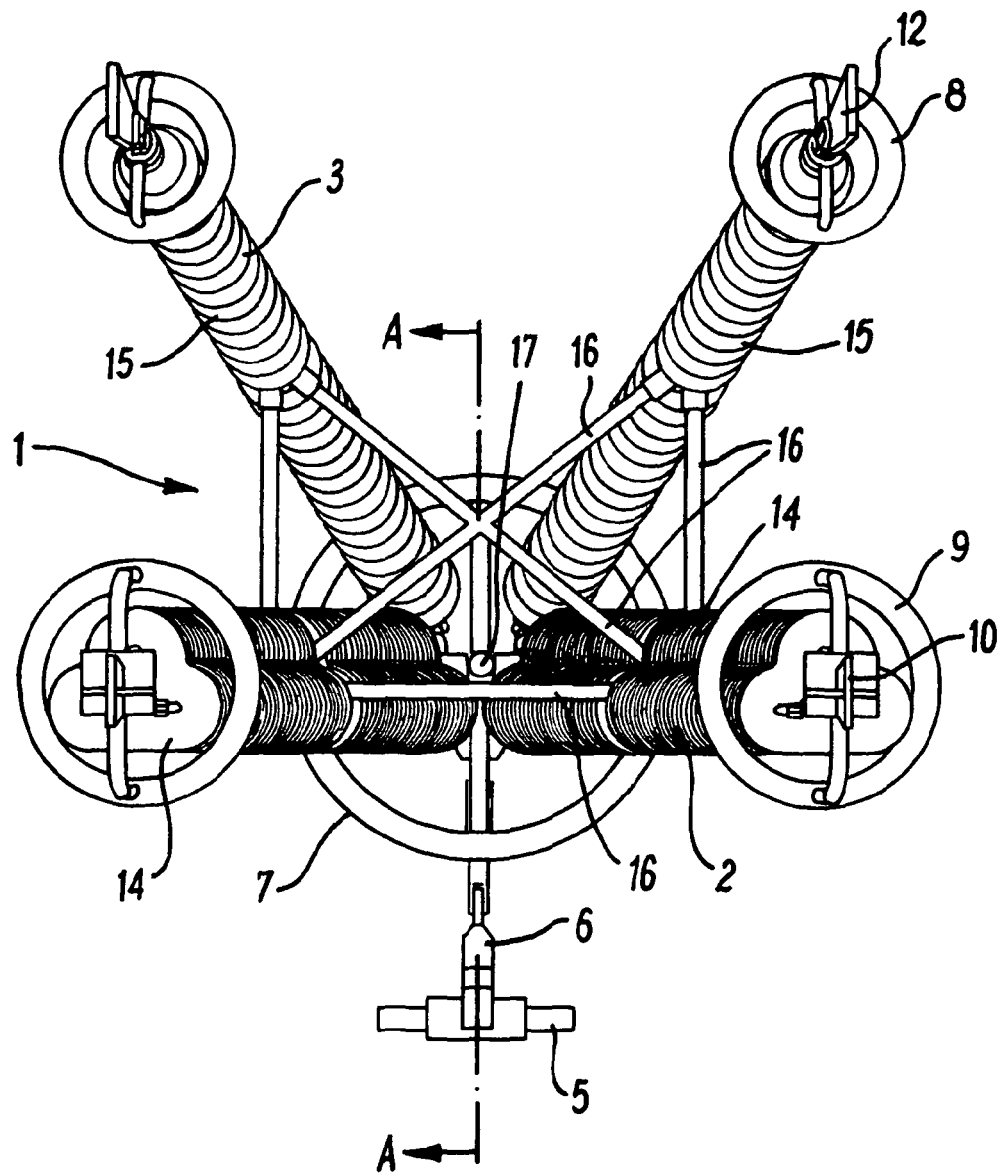
FIG. 3 shows a rear end view of the second embodiment from the base of the cross-arm.
Figure 4:
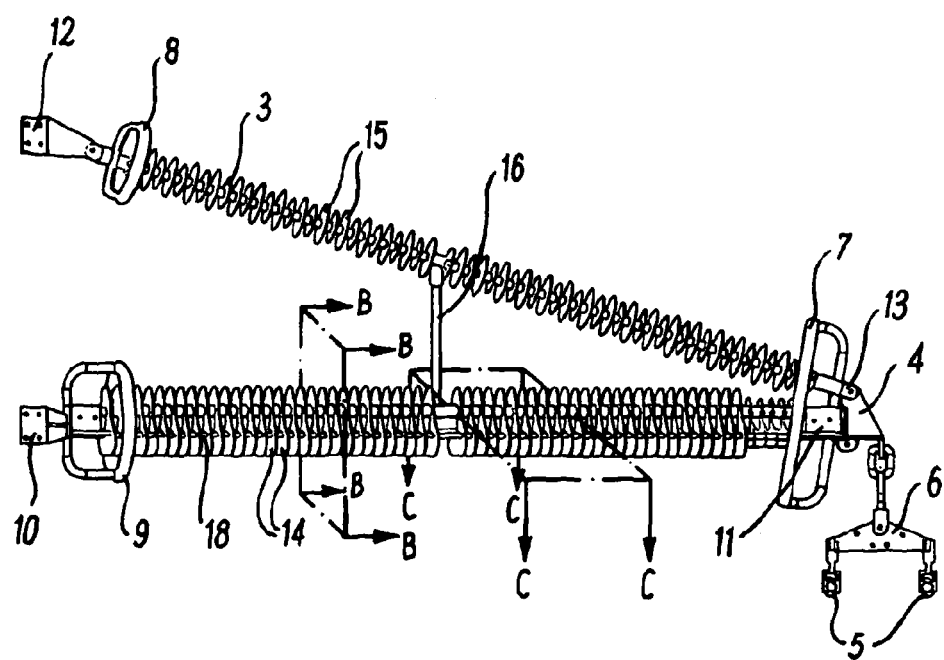
FIG. 4 shows a side view of the second embodiment of the invention.
Figure 5:
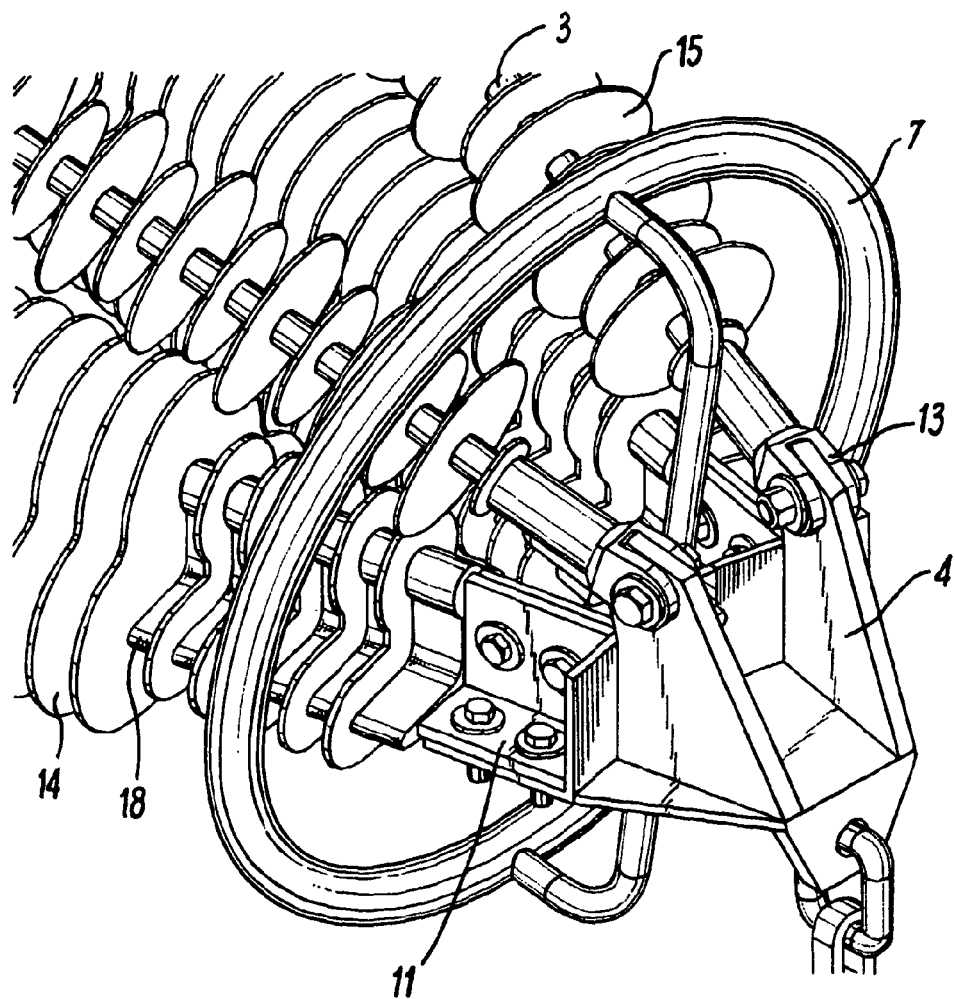
FIG. 5 shows an expanded isometric view showing detail of the apex of the cross-arm of the first or second embodiment.
Figure 6:
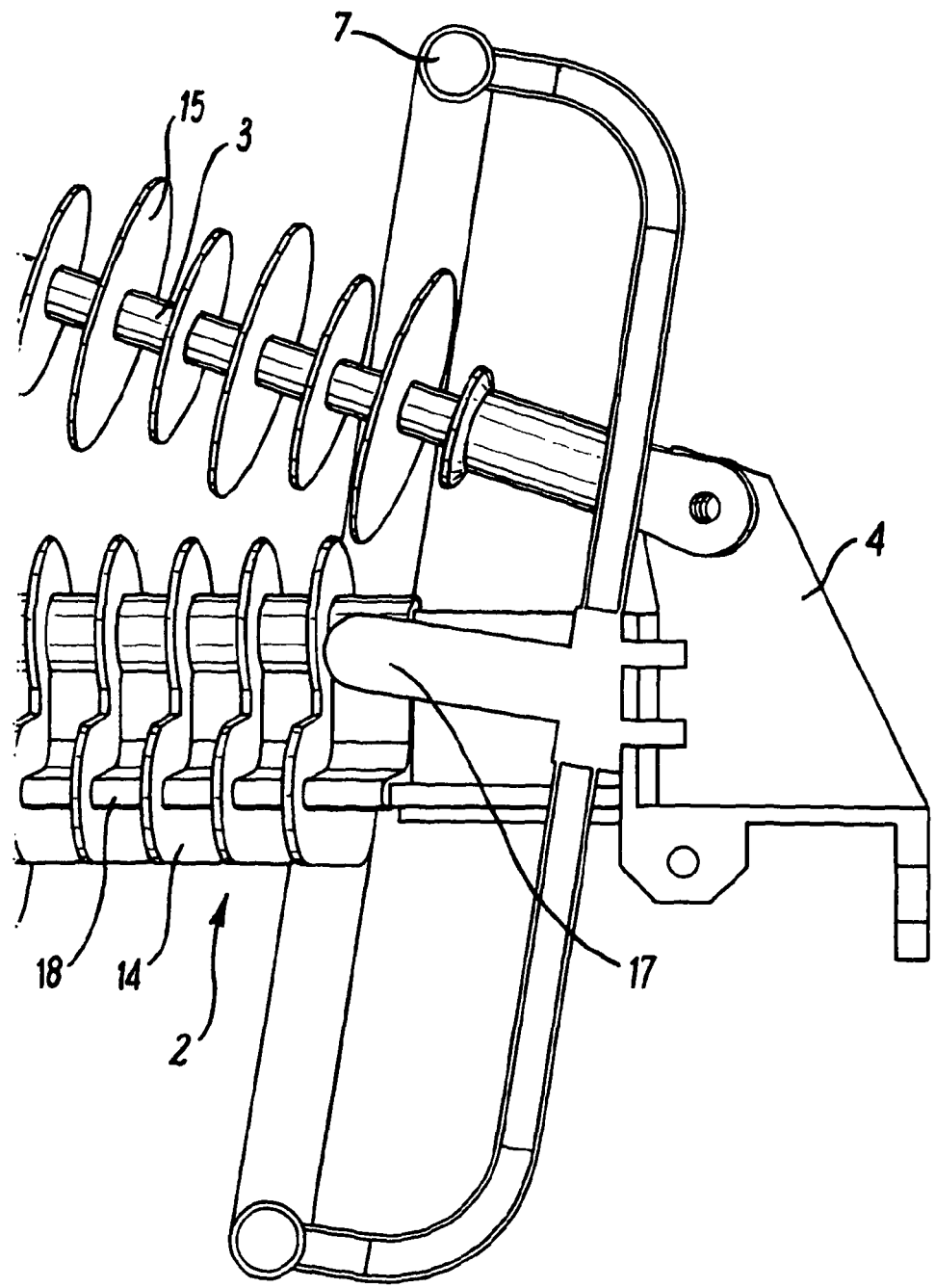
FIG. 6 shows an expanded side cross-sectional view along section A-A from FIG. 3 showing detail of the central conductive post of the grading ring at the apex of the cross-arm of the first or second embodiment.
Figure 7:
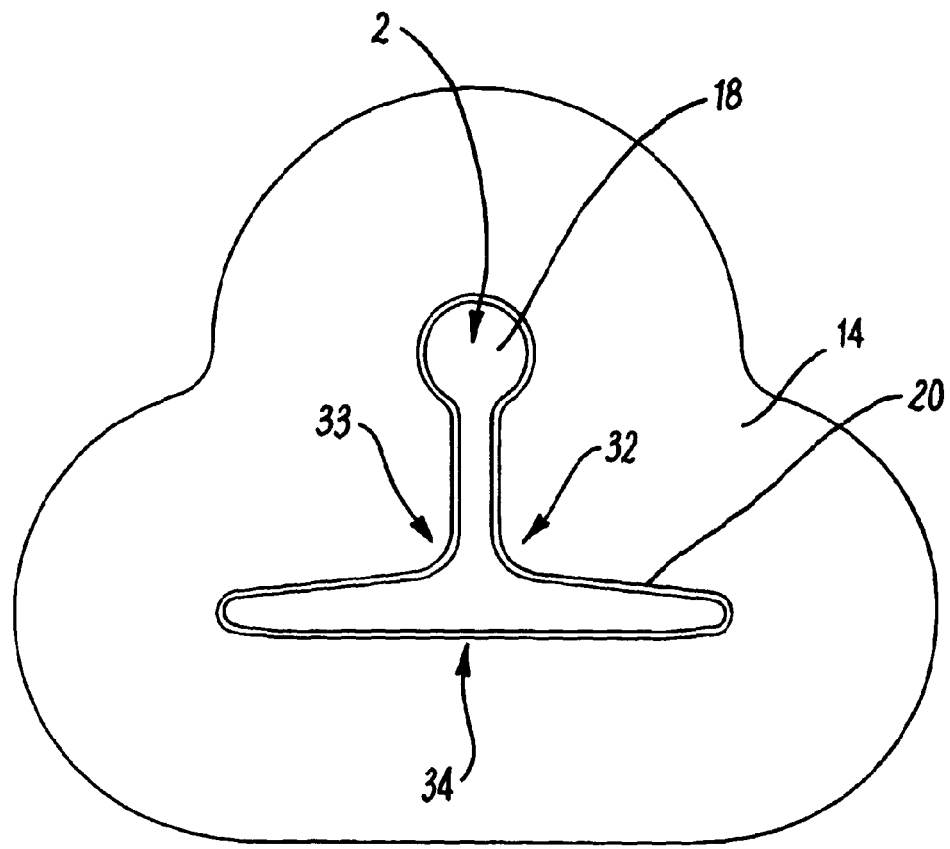
FIG. 7 shows a cross-sectional view through first insulating structural member 2 of the first or second embodiment, with the cross-section taken normal to the long axis of the member along section B-B from FIG. 4.
Figure 9:
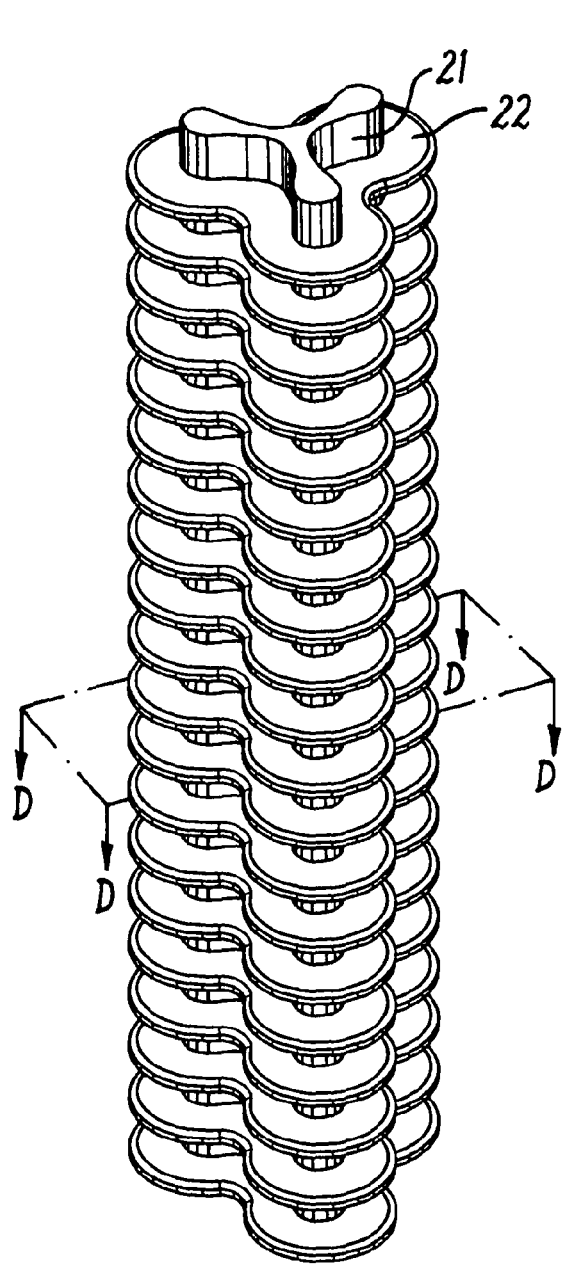
FIG. 9 shows an insulating member according to a third embodiment of the invention which is according to the third aspect of the invention.
Figure 10:
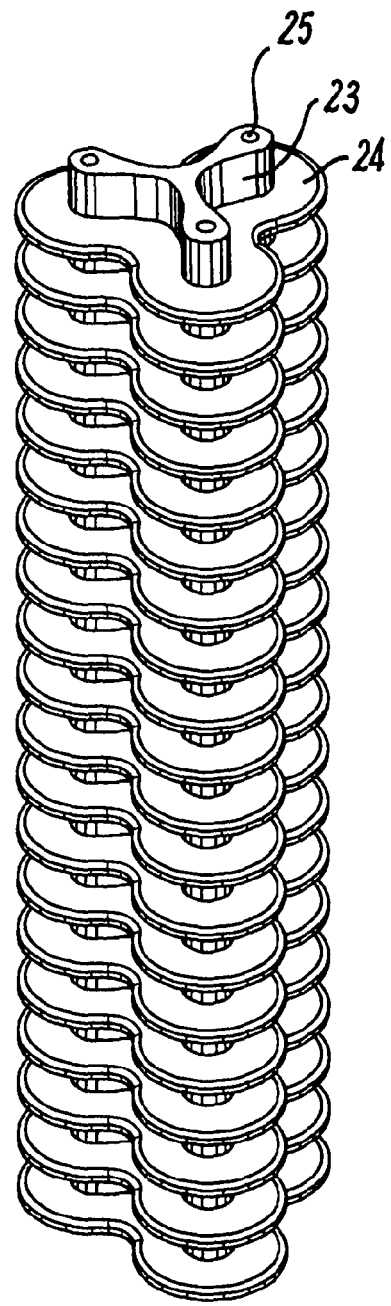
FIG. 10 shows an insulating member according to a fourth embodiment of the invention which is according to the third aspect of the invention.
Figure 11:
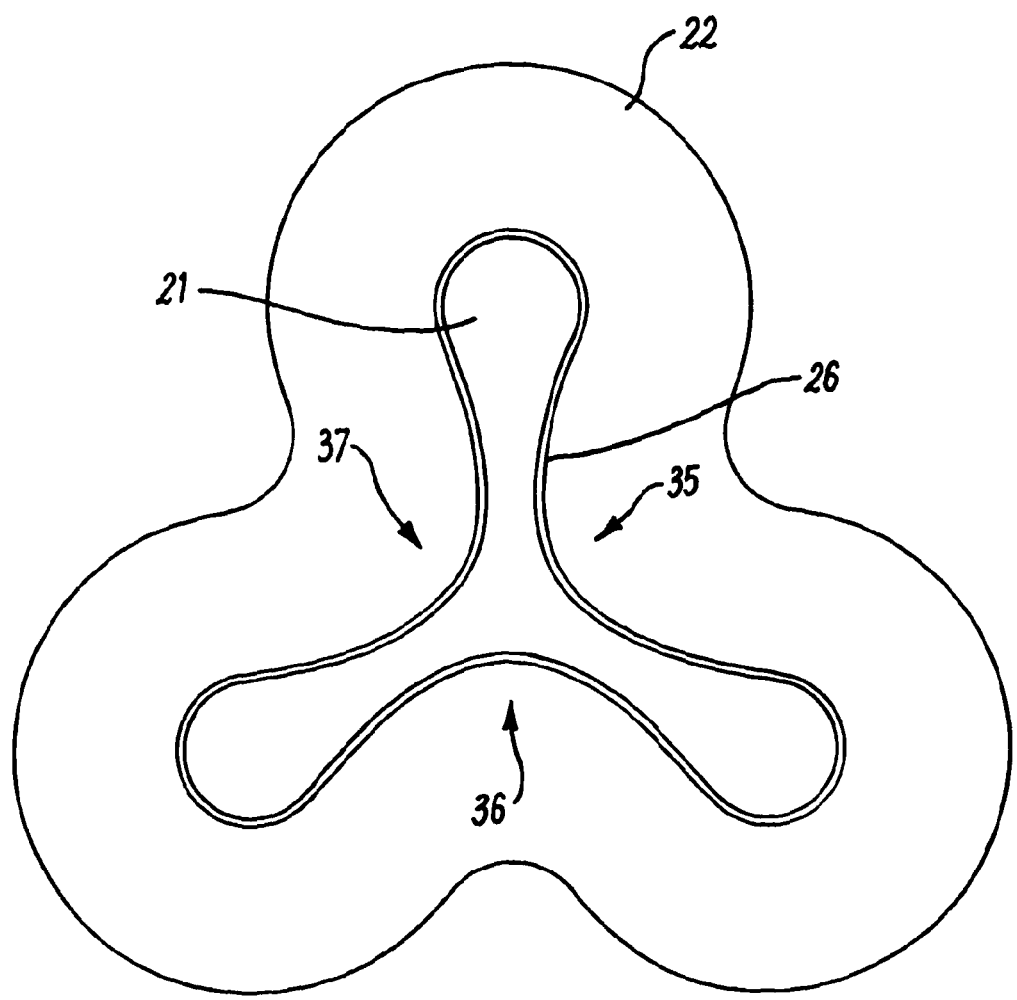
FIG. 11 shows a cross-sectional view through the insulating member of the third embodiment shown in FIG. 9 viewed along section D-D from FIG. 9.

Specific embodiments of the present invention will now be described, by way of example only, with reference to the accompanying drawings in which:

FIG. 1 shows an isometric view of a cross-arm according to a first embodiment of the first aspect of the invention, FIG. 2 shows an isometric view of a cross-arm according to a second embodiment of the first aspect of the invention, where substantially in plane redundant members are included, FIG. 3 shows a rear end view of the second embodiment from the base of the cross-arm, FIG. 4 shows a side view of the second embodiment of the invention, FIG. 5 shows an expanded isometric view showing detail of the apex of the cross-arm of the first or second embodiment, FIG. 6 shows an expanded side cross-sectional view along section A-A from FIG. 3 showing detail of the central conductive post of the grading ring at the apex of the cross-arm of the first or second embodiment, FIG. 7 shows a cross-sectional view through first insulating structural member 2 of the first or second embodiment, with the cross-section taken normal to the long axis of the member along section B-B from FIG. 4, FIG. 8 shows a cross-sectional view through first insulating structural member 2 of the first or second embodiment along section C-C from FIG. 4, with the cross-section taken parallel to the long axis of the member, FIG. 9 shows an insulating member according to a third embodiment of the invention which is according to the third aspect of the invention, FIG. 10 shows an insulating member according to a fourth embodiment of the invention which is according to the third aspect of the invention, FIG. 11 shows a cross-sectional view through the insulating member of the third embodiment shown in FIG. 9 viewed along section D-D from FIG. 9, FIG. 12 shows an insulating member according to the fourth embodiment, with conductors present and FIG. 13 shows an insulating member according to a fifth embodiment of the invention which is according to the third aspect of the invention and with a conductor present.

Turning to the first and second embodiments as shown in FIGS. 1 to 8, the cross-arm 1 has two first insulating members 2 and two second insulating members 3 each attached to a conductor support bracket 4 forming an apex or nose of the cross-arm. The distal ends of first insulating members 2 are attached to the nose piece 4 by bolted attachment plates 11 and the distal ends of second insulating members 3 are attached by bolted fasteners 13.

The proximal ends of first insulating members 2 are provided with attachment plates 10 adapted to permit attachment to the body of a high voltage tower or pylon (not shown). Similar attachment plates 12 are provided at the proximal ends of second insulating members 3. The conductor support bracket 4 holds the distal ends of the insulating members 2, 3 and supports the conductors 5 by means of a plate 6 suspended from the cable support bracket 4.

The proximal end of each first insulating member 2 is provided with a conductive grading ring 9. The proximal end of each second insulating member 3 is provided with a conductive grading ring 8. A distal conductive grading ring assembly 7 at the apex of the cross-arm 1 includes a conductive post 17 (visible in FIG. 6) which is in conductive contact with the distal conductive grading ring 7, located centrally therein and extending into the space formed at the apex where the insulating support members 2, 3 meet at the conductor support bracket 4.

Hence the cross-arm 1 is arranged to form a pyramidal structure extending from a quadrilateral base at the tower body to an apex at the conductor support bracket 4.

FIGS. 7 and 8 show the first insulating members 2 have a spine 18 and sheds 14 disposed along the spine and positioned normal to the long axis of the member. A layer of silicone elastomer 20 enrobes the surfaces of the spine 18 and sheds 14 are bonded to the later 20 on the first insulating members 2. The cross-sectional profile of spine 18 is substantially an inverted T-shape (i.e., having three rib-like protrusions extending along its axis) with a lobed end to the central body of the T and rounded ends at the terminations of the arms of the T. This cross sectional profile has a minimum second moment of area (about a vertical axis passing through the centroid with the orientation shown in the figure) of 3.6 times that of a circle of equivalent area. This cross-sectional profile provides two concave faces 32, 33 between the ribs and one substantially flat or slightly convex face 34. The shed 14 is shaped to provide a substantially uniform creepage length around its perimeter.

Returning to FIGS. 1 to 6, the second insulating members 3 have a cylindrical spine and circular sheds 15. The surface of the spine is also enrobed in a layer of silicone polymer. The sheds 15 are of silicone polymer.

The second embodiment differs from the first embodiment in that it further includes redundant members 16 interconnecting the insulating members 2, 3 and with the redundant members 16 arranged in a plane substantially parallel to the base formed by the proximal ends of the insulating members 2, 3.

In use, the proximal ends of the insulating members 2, 3 are bolted to the body of a tower or pylon with the first insulating members 2 substantially horizontal as shown in FIG. 4 such that the cross-sectional profile of the first insulating members 2 is oriented with the flat face 34 downwards and the concave faces 32, 33 directed upwards and outwards as shown in FIG. 7.

Turning to the third embodiment of the invention as shown in FIGS. 9 and 11, this is an insulating member according to the third aspect of the invention, and would be suitable, for instance, as a support post for a conductor. In this embodiment, the spine 21 has a Y-shaped cross section with each of three similar rib-like protrusions forming the lobed and rounded arms of the Y. This cross sectional profile yields a minimum second moment of area about (a vertical axis passing through the centroid in the configuration shown) of 4.6 times that of a circle of equivalent area. Three concave faces 35, 36, 37 are formed between the ribs as indicated in FIG. 11. The accompanying silicone sheds 22 are shaped to give a substantially uniform creepage distance around their perimeters, and the spine is enrobed in a silicone polymer layer 26.

The fourth embodiment shown in FIGS. 10 and 12 is also an insulating member according to the third aspect of the invention and is suitable for use as a post-insulator (or bushing) with conductors 27 running along its length. The insulating member is similar in shape to the third embodiment with spine 23 and sheds 24 of similar Y-shape. The difference from the third embodiment is that each of the rib-like protrusions forming the arms of the Y is provided with a respective channel or passage 25, towards its distal part, extending along the length of the insulating member through which conductors 27 may be threaded.

The fifth embodiment shown in FIG. 13 is also an insulating member according to the third aspect of the invention and is suitable for use as a post-insulator with conductors 30 running down a single channel along its length. The insulating member shown is essentially similar in shape to the third embodiment with spine 28 and sheds 29 of similar Y-shape. The difference from the third embodiment is that the central region of the spine 28 is provided with a channel or passage 31, extending along the length of the insulating member through which a conductor 30 may be threaded.

It will be appreciated that numerous modifications to the above described embodiments may be made without departing from the scope of the invention as defined in the appended claims. For instance, although the first insulating cross-arms are substantially horizontal in use for the first and second embodiments set out above, a configuration of the cross-arm in which the first insulating members are inclined to the horizontal in use would also be suitable for the invention. For instance, the first insulating members could incline upwards at an angle of say 20° to the horizontal in use, from the proximal to the distal ends. For instance, although the sheds on the first insulating members are shown only as varying in size towards the apex of the cross-arm (to facilitate fitting to the cable support bracket 4), the first insulating arm could instead by provided with sheds of alternating large and small cross sections, as shown for the first insulating members. For instance, the second insulating members 3 may contain sheds of all the same size rather than alternating. For instance, the cross-arm may be provided with arcing horns/co-ordination gaps for the purposes of insulation co-ordination, as is well known in the field of high voltage insulation assemblies.

The described and illustrated embodiments are to be considered as illustrative and not restrictive in character, it being understood that only the preferred embodiments have been shown and described and that all changes and modifications that come within the scope of the inventions as defined in the claims are desired to be protected. It should be understood that while the use of words such as "preferable", "preferably", "preferred" or "more preferred" in the description suggest that a feature so described may be desirable, it may nevertheless not be necessary and embodiments lacking such a feature may be contemplated as within the scope of the invention as defined in the appended claims. In relation to the claims, it is intended that when words such as "a," "an," "at least one," or "at least one portion" are used to preface a feature there is no intention to limit the claim to only one such feature unless specifically stated to the contrary in the claim. When the language "at least a portion" and/or "a portion" is used the item can include a portion and/or the entire item unless specifically stated to the contrary.

The invention claimed is:

1. An electrically insulating cross-arm for a tower arranged to carry power conductors spaced from a body of said tower, the cross-arm comprising at least one first insulating structural member having a proximal end adapted for attachment to the tower body and a distal end adapted for attachment to a conductor support means,
   wherein the first insulating structural member comprises a solid rigid spine extending along a long axis between the distal and proximal ends and wherein the spine has a cross sectional profile, normal to the long axis, having a centroid and wherein the second moment of area of the cross sectional profile about every axis normal to the long axis and dissecting the centroid has a value of $A^2/2\pi$ or more, where A is the area of the cross sectional profile, and
   wherein the rigid spine comprises three rib-like protrusions extending along the axis, arranged to form at least two substantially concave faces therebetween and wherein the cross-sectional profile of the rigid spine is substantially T or Y shaped, the rib-like protrusions providing the arms of the T or Y shape.

2. The cross-arm of claim 1 wherein the ribs are arranged to provide two concave faces and one flat or convex face therebetween.

3. The cross-arm of claim 2 adapted for positioning in use such that the first insulating member is positioned with the concave faces directed upwards and outwards, and the flat or convex face directed downwards.

4. The cross-arm of claim 1 wherein the cross-sectional profile of the rigid spine of the first insulating structural member has a curved perimeter such that the curved perimeter has a radius of curvature at all points thereon whose magnitude is greater than 1% of the greatest width of the cross-sectional profile measured along all axes dissecting the centroid.

5. The cross-arm of claim 1 wherein the cross-arm further comprises a second insulating structural member having a proximal end adapted for attachment to said tower body at a base and a distal end adapted for attachment to the conductor support means, the second insulating structural member being adapted to resist at least tensile loading.

6. The cross-arm of claim 5 wherein the cross-arm in use comprises two first insulating structural members located below two second insulating structural members together arranged to form a pyramidal structure extending from a quadrilateral base at the tower body to an apex at the conductor support means.

7. The cross-arm of claim 6 wherein proximal conductive grading rings are provided at the proximal ends of the first and second insulating members.

8. The cross-arm of claim 6 wherein a distal conductive grading ring assembly is provided at the apex of the pyramidal structure.

9. The cross-arm of claim 8 wherein the distal conductive grading ring assembly comprises a distal conductive grading ring arranged to encircle the distal ends of the first and second insulating members and a conductive post in conductive contact with the distal grading ring, located centrally within the distal grading ring and extending into a space formed between the distal ends of the first and second insulating members.

10. The cross-arm of claim 1 wherein the insulating structural members are provided with sheds whereby a creepage distance along each insulating member exceeds its length.

11. The cross-arm of claim 10 wherein the sheds are shaped such that a creepage path length contributed by each shed is substantially the same around its entire perimeter.

12. A tower for high voltage power distribution comprising one or more cross-arms according to claim 1.

13. An insulating structural member, for use with high voltage power networks, comprising a solid rigid spine extending along a long axis between the distal and proximal ends wherein the spine has a cross sectional profile, normal to the long axis, having a centroid, wherein the second moment of area of the cross sectional profile about every axis normal to the long axis and dissecting the centroid has a value of $A^2/2\pi$ or more, where A is the area of the cross sectional profile, and
   wherein the rigid spine comprises three rib-like protrusions extending along the axis arranged to form at least two substantially concave faces therebetween and wherein the cross-sectional profile of the rigid spine is substantially T or Y shaped, the rib-like protrusions providing the arms of the T or Y shape.

14. The insulating structural member of claim 13 wherein the ribs are arranged to provide two concave faces and one flat or convex face therebetween.

15. The insulating structural member of claim 13 comprising one or more channels adapted to permit high voltage conductors to extend through the insulating structural member.

16. The insulating structural member of claim 15 wherein at least one of the rib-like protrusions comprises a channel suitable for carrying a high voltage conductor.

17. The insulating structural member of claim 13 wherein the cross-sectional profile of the rigid spine of the insulating structural member has a curved perimeter such that the curved perimeter has a radius of curvature at all points thereon whose magnitude is greater than 1% of the greatest width of the cross-sectional profile measured along all axes dissecting the centroid.

18. The insulating structural member of claim 13 wherein the insulating structural member is provided with sheds whereby a creepage distance along the insulating member exceeds its length, and > wherein the sheds are shaped such that a creepage path length contributed by each shed is substantially the same around its entire perimeter.

* * * * *